United States Patent
Yang et al.

(10) Patent No.: US 8,630,053 B2
(45) Date of Patent: Jan. 14, 2014

(54) SYSTEMS AND METHODS FOR PARAMETER MODIFICATION DURING DATA PROCESSING RETRY

(75) Inventors: Shaohua Yang, Santa Clara, CA (US); Jin Lu, Lafayette, CO (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 34 days.

(21) Appl. No.: 13/372,600

(22) Filed: Feb. 14, 2012

(65) Prior Publication Data

US 2013/0208376 A1  Aug. 15, 2013

(51) Int. Cl.
*G11B 5/09* (2006.01)

(52) U.S. Cl.
USPC ............... 360/65; 360/25; 360/31

(58) Field of Classification Search
USPC ............ 360/65, 31, 77.04, 32, 25, 29, 39, 40; 714/752, 794, 786, 805; 325/259, 261
See application file for complete search history.

(56) References Cited

U.S. PATENT DOCUMENTS

| | | | |
|---|---|---|---|
| 5,701,314 A | 12/1997 | Armstrong | |
| 5,712,861 A | 1/1998 | Inoue | |
| 6,438,717 B1 | 8/2002 | Butler | |
| 6,587,407 B1 * | 7/2003 | Hino et al. | 369/44.14 |
| 6,657,803 B1 | 12/2003 | Ling | |
| 7,136,244 B1 | 11/2006 | Rothberg | |
| 7,702,989 B2 | 4/2010 | Graef | |
| 7,730,384 B2 | 6/2010 | Graef | |
| 7,738,201 B2 | 6/2010 | Jin | |
| 7,971,125 B2 | 6/2011 | Graef | |
| 7,990,642 B2 | 8/2011 | Lee | |
| 8,176,404 B2 | 5/2012 | Yang | |
| 2011/0080211 A1 | 4/2011 | Yang | |
| 2011/0161633 A1 | 6/2011 | Xu | |
| 2012/0200954 A1 | 8/2012 | Jin | |
| 2012/0236429 A1 | 9/2012 | Yang | |

OTHER PUBLICATIONS

Olmos et al., "Tree-Structure Expectation Propagation for LDPC Decoding in Erasure Channels", Cornell University Library arXiv:1009.4287 (Sep. 22, 2010).
U.S. Appl. No. 13/326,367, Unpublished (filed Dec. 15, 2011) (Shaohua Yang).
U.S. Appl. No. 13/326,363, Unpublished (filed Dec. 15, 2011) (Fan Zhang).

* cited by examiner

*Primary Examiner* — Nabil Hindi
(74) *Attorney, Agent, or Firm* — Hamilton DeSanctis & Cha

(57) ABSTRACT

Various embodiments of the present invention provide systems and methods for data processing. For example, a data processing system is discussed that includes: a buffer circuit, an equalizer circuit, a data processing circuit, and a retry determination circuit. The buffer is operable to store digital samples as a buffered output, and the equalizer circuit is operable to equalize the buffered output using a first equalization target to yield a first equalized output, and to yield a second equalized output using a second equalization target. The retry determination circuit is operable to select the second equalization target based at least in part on an occurrence of an error.

20 Claims, 4 Drawing Sheets

SYSTEMS AND METHODS FOR PARAMETER MODIFICATION DURING DATA PROCESSING RETRY

BACKGROUND OF THE INVENTION

The present inventions are related to systems and methods for processing data, and more particularly to systems and methods for retrying a previously failed data processing.

Some devices rely on magneto-resistive heads to sense information which is then processed to recover an originally written data set. Such heads typically exhibit some level of non-linear distortion that causes significant degradation in the performance of a data detection circuit, and in some cases disqualification of magneto-resistive heads where the degradation becomes too large. To avoid this degradation, magneto-resistive head compensation is applied to an analog signal derived from a magneto-resistive head to yield a corrected signal. The corrected signal is then filtered and the resulting filtered output is converted to a series of digital samples representing the filtered output. Digital data processing is then applied to the series of digital samples to yield the original data set. Existing approaches are, however, costly in terms of the circuitry required to perform the correction and/or of limited effectiveness.

Hence, for at least the aforementioned reasons, there exists a need in the art for advanced systems and methods for data processing.

BRIEF SUMMARY OF THE INVENTION

The present inventions are related to systems and methods for processing data, and more particularly to systems and methods for retrying a previously failed data processing.

Various embodiments of the present invention provide data processing systems that include: an analog to digital converter circuit, a buffer circuit, an equalizer circuit, a data processing circuit, and a retry determination circuit. The analog to digital conversion circuit is operable to convert an input signal into corresponding digital samples, and the buffer is operable to store the digital samples as a buffered output. The equalizer circuit is operable to equalize the buffered output using a first equalization target to yield a first equalized output, and the data decoding circuit is operable to decode the first equalized output to yield a first data output. The retry determination circuit is operable to select a second equalization target based at least in part on an occurrence of an error in the data output. The equalizer circuit is further operable to equalize the buffered output using the equalization target to yield a second equalized output, and the data decoding circuit is further operable to decode the second equalized output to yield a second data output. In some instances of the aforementioned embodiments, the data processing system is implemented as part of an integrated circuit. In various instances of the aforementioned embodiments, the data processing system is implemented as part of a data storage device. In other embodiments of the present invention, the data processing system is implemented as part of a communication device. In particular cases, the equalizer circuit is a digital finite impulse response filter circuit.

In some instances of the aforementioned embodiments, the data processing system further includes a target set buffer operable to store at least the first equalization target and the second equalization target. In such cases, the first equalization target and the second equalization target do not require additional adaptation in the data processing system. In particular instances of the aforementioned embodiments, the data decoding circuit includes a data detector circuit and a data decoder circuit. The data detector circuit includes a noise predictive filter circuit operable to filter a received input based upon a filter target input. In some such instances, the retry determination circuit is further operable to select the first equalization target based at least in part on an occurrence of an error in a third data output that precedes the first data output, and the retry determination circuit is further operable to cause a previously adapted filter target used as the filter target input to be stored along with selecting the first equalization target. In various cases, the retry determination circuit is further operable to cause the previously adapted equalization target to be restored where the second data output does not exhibit an error.

In some instances of the aforementioned embodiments, the retry determination circuit is further operable to select the first equalization target based at least in part on an occurrence of an error in a third data output that precedes the first data output. In such cases, the retry determination circuit is further operable to cause a previously adapted equalization target to be stored along with selecting the first equalization target. In some such cases, the retry determination circuit is operable to cause the previously adapted equalization target to be restored where the second data output does not exhibit an error. In various cases, the equalizer circuit is a first equalizer circuit, and the data processing circuit further includes a second equalizer circuit that is operable to equalize the digital samples using the previously adapted equalization target to yield a third equalized output. The third data output corresponds to the third equalized output. In various cases, the equalizer circuit is further operable to equalize the buffered output using the previously adapted equalization target yield a third equalized output, and the third data output corresponds to the third equalized output.

Other embodiments of the present invention provide methods for data retry processing. The methods include: converting an input signal into a corresponding series of digital samples using an analog to digital converter circuit; buffering the digital samples to yield a buffered output; and equalizing the digital samples using a previously adapted equalization target to yield a first equalized output; processing the first equalized output to yield a first data output. The first data output exhibits an error. Based at least in part on the error, the methods further include: storing the previously adapted equalization target; selecting a predetermined equalization target; equalizing the buffered output using the predetermined equalization target to yield a second equalized output; and processing the second equalized output to yield a second data output.

In some instances of the aforementioned embodiments, processing the first equalized target includes applying a data detection algorithm to the first equalized target to yield a first detected output, and applying a data decode algorithm to the first detected output to yield the first data output. Processing the second equalized target includes applying the data detection algorithm to the second equalized target to yield a second detected output, and applying the data decode algorithm to the second detected output to yield the second data output. In some cases, the data detection algorithm includes application of noise predictive filtering governed by a filter target. In such cases, the methods may further include storing the filter target based at least at part on the error. In some cases where the second data output is error free, the filter target and the previously adapted equalization target are restored.

In various instances of the aforementioned embodiments, the predetermined equalization target is a first predetermined equalization target, the error is a first error, and the second data output exhibits a second error. Based at least in part on the second error the methods include: storing the previously adapted equalization target; selecting a second predetermined equalization target; equalizing the buffered output using the second predetermined equalization target to yield a third equalized output; and processing the third equalized output to yield a third data output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for processing data, and more particularly to systems and methods for retrying a previously failed data processing.

Various embodiments of the present invention provide data processing circuits that include retry circuitry that allows for trying a number of different circuit parameters in an effort to recover an originally provided data set. Once the retry process is completed, previously adapted parameters are restored for use in processing a subsequent data set. In operation, where a data set cannot be recovered using a currently adapted set of parameters, a retry process is triggered. Prior to the retry process the currently adapted parameters are saved for later use. In addition, a new set of equalizer parameters are selected and the unrecoverable data set is repeatedly processed while the circuit parameters are re-adapted. Where the original data set is recovered, it is provided as an output. Alternatively, where the original data set is not recovered, another new set of equalizer parameters are selected and the process is repeated. This retry process is repeated until either the original data set is recovered or there are no additional sets of equalizer parameters to be tested. In some embodiments, the parameter that is changed is the equalizer parameter (e.g., filter taps for an equalizer filter), and other parameters are adapted using parameter adaptation circuitry known in the art. Such other parameters may include, but are not limited to, a variable gain feedback to a variable gain amplifier, a DC offset parameter, a magneto-resistive asymmetry compensation parameter, and a phase/frequency feedback to an analog to digital converter circuit.

Figure 1:
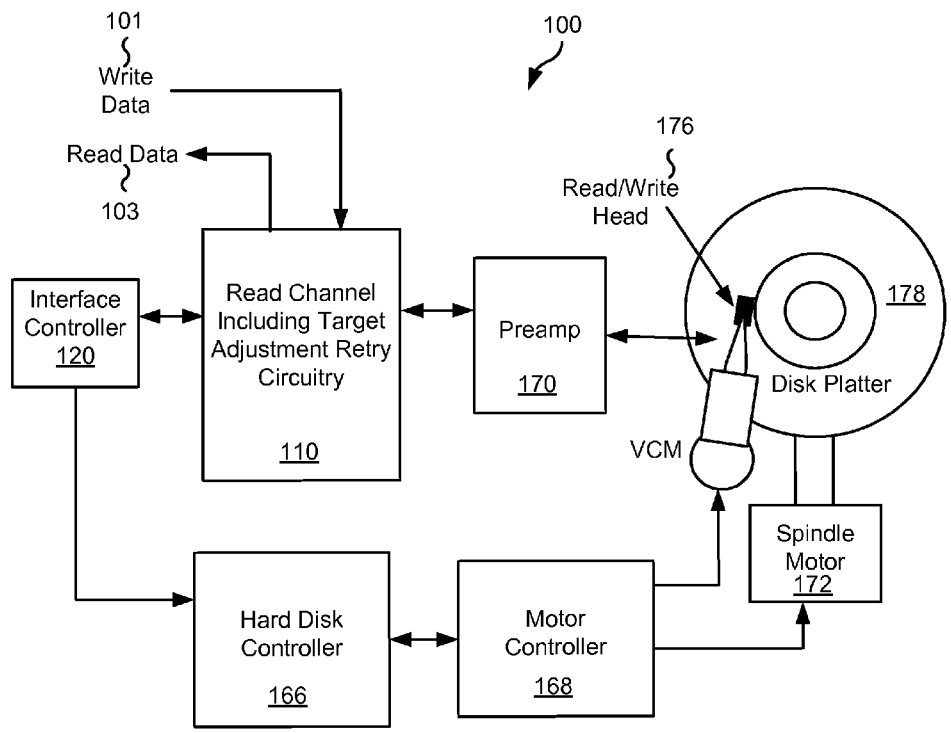
FIG. 1 shows a storage system including a read channel circuit having target adjustment retry circuitry in accordance with some embodiments of the present invention.

Turning to FIG. 1, a storage system 100 including a read channel circuit 110 having target adjustment retry circuitry is shown in accordance with one or more embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head assembly 176 that incorporates a magneto-resistive head. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

During operation, data accessed from disk platter 178 is processed using data processing circuitry using previously adapted parameters to recover an originally provided data set. Where a data set cannot be recovered using a currently adapted set of parameters, a retry process is triggered that utilizes target retry adjustment circuitry. Prior to the retry process the currently adapted parameters are saved for later use. In addition, a new set of equalizer parameters are selected and the unrecoverable data set is repeatedly processed while the circuit parameters are re-adapted. Where the original data set is recovered, it is provided as an output. Alternatively, where the original data set is not recovered, another new set of equalizer parameters are selected and the process is repeated. This retry process is repeated until either the original data set is recovered or there are no additional sets of equalizer parameters to be tested. In some cases, the target adjustment retry circuitry may be implemented similar to that discussed below in relation to FIG. 3 or FIG. 5. In various cases, the target adjustment retry circuitry may operate consistent with the approach discussed below in relation to FIG. 4.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

Figure 2:
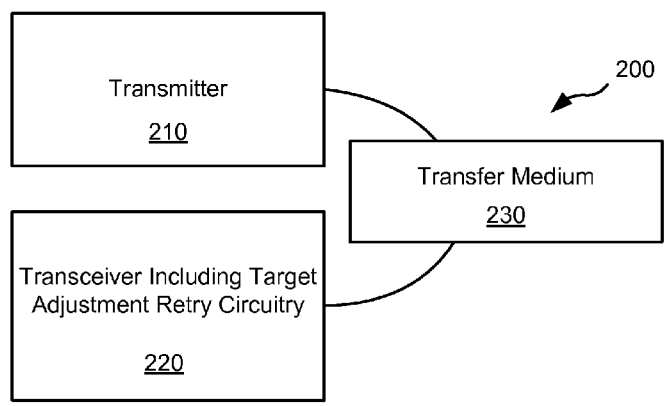
FIG. 2 depicts a communication system including a receiver having target adjustment retry circuitry in accordance with various embodiments of the present invention.

Turning to FIG. 2, a communication system 200 including a receiver 220 having digital MRA compensation circuitry is shown in accordance with some embodiments of the present invention. Communication system 200 includes a transmitter 210 that is operable to transmit encoded information via a transfer medium 230 as is known in the art. The encoded data is received from transfer medium 230 by receiver 220. Transfer medium 230 may be any transfer medium known in the art including, but not limited to, a wireless medium, a wired medium, storage medium, an optical medium, or the like. Based upon the disclosure provided herein, one of ordinary skill in the art will recognize a variety of transfer mediums that may be used in relation to different embodiments of the present invention.

During operation, information is transferred by transmitter 210 to receiver 220 via transfer medium 230. The received data is processed using data processing circuitry using previously adapted parameters to recover an originally provided data set. Where a data set cannot be recovered using a currently adapted set of parameters, a retry process is triggered that utilizes target retry adjustment circuitry. Prior to the retry process the currently adapted parameters are saved for later use. In addition, a new set of equalizer parameters are selected and the unrecoverable data set is repeatedly processed while the circuit parameters are re-adapted. Where the original data set is recovered, it is provided as an output. Alternatively, where the original data set is not recovered, another new set of equalizer parameters are selected and the process is repeated. This retry process is repeated until either the original data set is recovered or there are no additional sets of equalizer parameters to be tested. In some cases, the target adjustment retry circuitry may be implemented similar to that discussed below in relation to FIG. 3 or FIG. 5. In various cases, the target adjustment retry circuitry may operate consistent with the approach discussed below in relation to FIG. 4.

Figure 3:
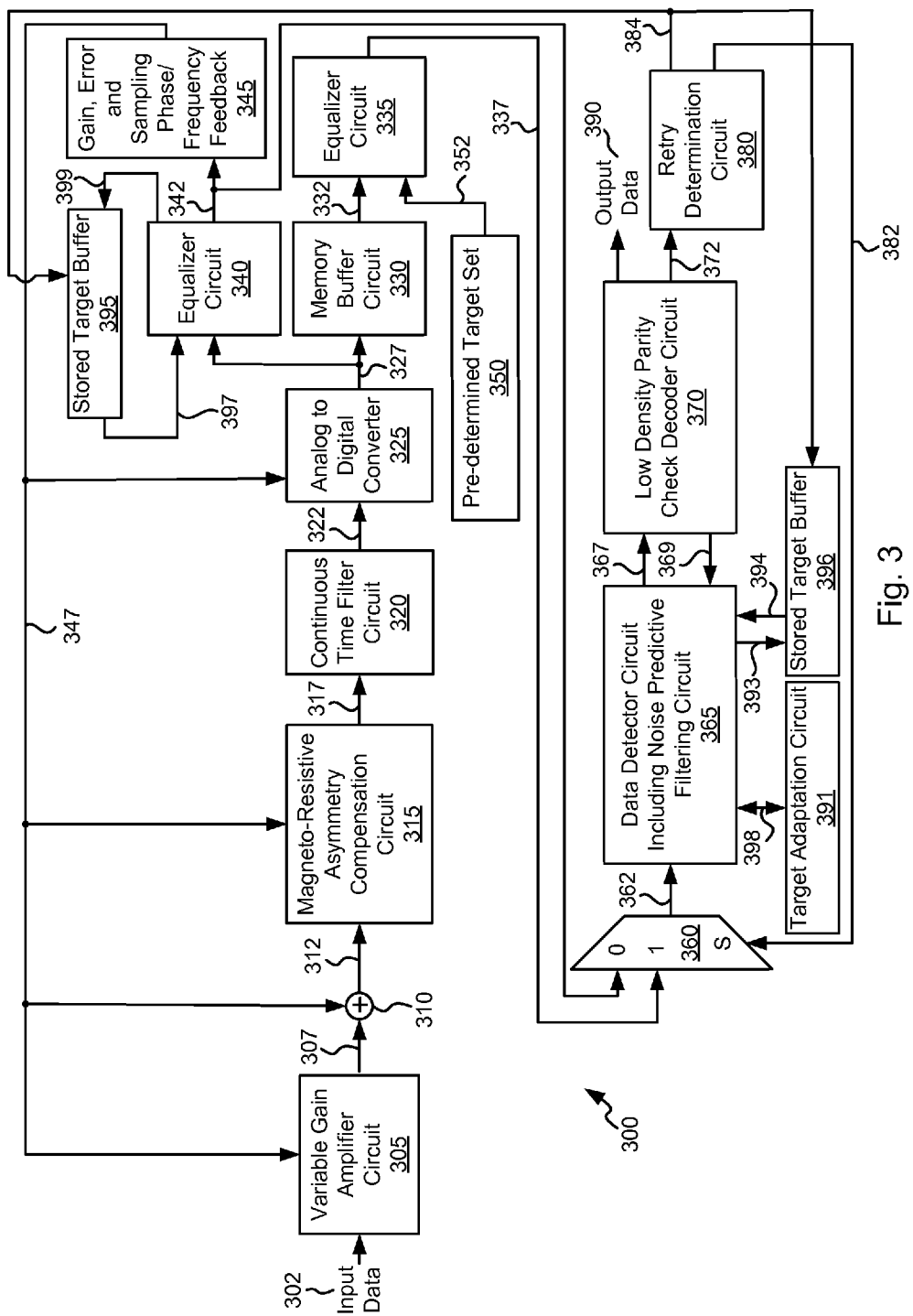
FIG. 3 depicts a data processing circuit including target adjustment retry circuitry in accordance with some embodiments of the present invention.

Turning to FIG. 3, a data processing circuit 300 including target adjustment retry circuitry is shown in accordance with some embodiments of the present invention. Data input circuit 300 includes a variable gain amplifier circuit 305 that applies a variable gain to an input data 302 yielding an amplified output 307. Variable gain amplifier circuit 305 may be any circuit known in the art that is capable of applying a variable gain to a received input. Input data 302 is an analog signal representing information that may be received from a variety of sources including, but not limited to, a storage medium of a storage device or a data transfer medium in relation to a communication device. Based upon the disclosure provided herein, one of ordinary skill in the art will recognize a variety of sources for input data 302. The gain applied by variable gain amplifier circuit 305 is received as part of a parameter set 347. Parameter set 347 includes a number of parameters including, but not limited to, a variable gain feedback provided to variable gain amplifier circuit 305, a DC offset parameter provided to a summation circuit 310, a magneto-resistive asymmetry compensation parameter provided to a magneto-resistive asymmetry compensation circuit 315, and a phase/frequency feedback provided to an analog to digital converter circuit 325.

Amplified output 307 is added to the DC offset parameter included as part of parameter set 347 to yield an offset corrected output 312. Offset corrected output 312 is provided to a magneto-resistive asymmetry compensation circuit 315 that is operable to compensate for asymmetry evident in input data 302 due to sensing by a magnetic sensing head (not shown) of a read/write head assembly (not shown). Magneto resistive asymmetry compensation circuit 315 provides the compensated input as a corrected output 317. Magneto resistive asymmetry compensation circuit 315 may be any circuit known in the art that is capable of mitigating asymmetry or non-linearity in a received signal. Based upon the disclosure provided herein, one of ordinary skill in the art will recognize a variety of magneto resistive asymmetry compensation circuits that may be used in relation to different embodiments of the present invention.

Corrected output 317 is provided to a continuous time filter circuit 320 that is operable to filter noise from the received input to yield a filtered output 322. Continuous time filter circuit 320 may be any circuit known in the art that is capable of filtering a received signal. In one particular embodiment of the present invention, continuous time filter circuit 320 is an RC or LC filter as are known in the art. Filtered output 322 is provided to analog to digital converter circuit 325. Analog to digital converter circuit 325 converts filtered output 322 to a corresponding series of digital samples 327. Analog to digital converter circuit 325 may be any circuit known in the art that is capable of converting a continuous time signal into a series of discrete samples. Based upon the disclosure provided herein, one of ordinary skill in the art will recognize a variety of analog to digital converter circuits that may be used in relation to different embodiments of the present invention.

Digital samples 327 are stored to a memory buffer circuit 330 and in parallel provided to an equalizer circuit 340. Memory buffer circuit 330 buffers a defined portion of the received data for later use in a retry process in the event the standard data processing does not converge. Equalizer circuit 340 equalizes the received input to yield an equalized output 342 that is provided to a parameter adaptation circuit 345 that is operable to adjust gain, error and/or sampling phase/frequency feedback signals that are provided as parameter set 347. In one particular embodiment of the present invention, equalizer circuit 340 is a digital finite impulse response filter as are known in the art. In some cases, the filter coefficients or taps used by the digital finite impulse response filter are programmable. In one particular case, the filter coefficients or taps may be adaptable from a default value using adaptation approaches known in the art. Parameter adaptation circuit 345 may be any circuit known in the art that is capable of adapting one or more of a variable gain feedback provided to variable gain amplifier circuit 305, a DC offset parameter provided to a summation circuit 310, a magneto-resistive asymmetry compensation parameter provided to a magneto-resistive asymmetry compensation circuit 315, and/or a phase/frequency feedback provided to an analog to digital converter circuit 325. In addition, equalized output 342 is provided to a selector circuit 360. In one particular embodiment of the present invention, selector circuit 360 is a multiplexer circuit. Based upon the disclosure provided herein, one of ordinary skill in the art will recognize other types of circuits that may be used in place of selector circuit 360.

In normal operation, a selector input 382 is asserted such that selector circuit 360 provides equalized output 342 as a data processing input 362. Data processing input 362 is provided to a data detector circuit 365. Data detector circuit 365 includes a noise predictive filter circuit. Data detector circuit 365 applies a data detection algorithm to data processing input 362 to yield a detected output 367. Data detector circuit may be, but is not limited to, a maximum a posteriori data detector circuit or a Viterbi algorithm data detector circuit as are known in the art. Based upon the disclosure provided herein, one of ordinary skill in the art will recognize a variety of data detector circuits that may be used in relation to different embodiments of the present invention. A target adaptation circuit 391 is operable to adaptively modify a target output 398 that in part governs operation of the noise predictive filter circuit included as part of data detector circuit 365. Target adaptation circuit 391 may implement any process or approach known in the art for adapting coefficients or taps for a noise predictive filtering circuit.

In turn, a data decoder circuit 370 applies a data decode algorithm to detected output 367 to yield a decoded output. In some embodiments of the present invention, the data decode algorithm is a low density parity check algorithm as are known in the art. Based upon the disclosure provided herein, one of ordinary skill in the art will recognize other data decode algorithms that may be used in relation to different embodiments of the present invention. Where the data decode algorithm converges (i.e., the original data is recovered), the decoded output is provided as output data 390 and a successful completion is indicated to a retry determination circuit via an output 372. Alternatively, where the data decode algorithm fails to converge (i.e., errors remain), it is determined whether another pass through data detector circuit 365 and data decoder circuit 370 (i.e., a global iteration) is allowed. Where another pass is allowed, the decoded output is provided as a feedback output 369 to data detector circuit 365 where it is used to guide a subsequent application of the data detection algorithm to data processing input 362.

On the other hand, where the decoded output fails to converge and no more passes through data detector circuit 365 and data decoder circuit 370 are allowed, a failure indication is provided to retry determination circuit 380 as output 372. Retry determination circuit 380 selects whether an offline retry of the currently processing reset is to be performed. In some cases, a retry is performed on all data sets that fail to converge. In other cases, a retry is conditional. Where it is determined that a retry is desired, retry determination circuit 380 asserts a storage control signal 384 that causes the currently adapted target 399 used by equalizer circuit 340 to be stored in a stored target buffer 395, and causes the currently adapted target 393 used by the noise predictive filter circuit of data detector circuit 365 to be stored in a stored target buffer 396. In addition, retry determination circuit 380 asserts selector input 382 causing selector circuit 360 to provide an equalized output 337 as data processing input 362.

In such a retry condition, the data set that failed to converge was previously stored to memory buffer circuit 330 and is available as a buffered output 332. Buffered output 332 is provided to equalizer circuit 335 that equalizes buffered output 332 to yield equalized output 337 that, as discussed above, is provided by selector circuit 360 as data processing input 362. The operation of equalizer circuit 335 is governed at least in part by a target 352 that is selected from a predetermined target set 350. Pre-determined target set 350 may be a number of target values that are stored for use in relation to a retry processing mode of data processing circuit 300. In operation, when a retry is necessary and a new target from pre-determined target set 350 is chosen, the coefficients of equalizer circuit 335 are re-adapted. After the adaptation is complete, the equalizer is used to generate equalized output 337 based upon the new target.

Data processing input 362 is provided to a data detector circuit 365 that applies the data detection algorithm to data processing input 362 to yield a detected output 367. In turn, data decoder circuit 370 applies the data decode algorithm to detected output to yield a decoded output. Where the data decode algorithm converges (i.e., the original data is recovered), the decoded output is provided as output data 390 and an indication of a successful retry is provided as output 372 to retry determination circuit 380. At this juncture, retry determination circuit 380 asserts selector input 382 such that selector circuit 360 provides equalized output 342 as a data processing input 362, and asserts storage control signal 384 that causes the previously stored target 397 to be loaded back into equalizer circuit 335 and causes the previously stored target 394 to be loaded back into the noise predictive filter circuit of data detector circuit 365 so that the next received data set can rely on the previously adapted targets.

Alternatively, where the data decode algorithm fails to converge (i.e., errors remain), it is determined whether another pass through data detector circuit 365 and data decoder circuit 370 is allowed. Where another pass is allowed, the decoded output is provided as a feedback output 369 to data detector circuit 365 where it is used to guide a subsequent application of the data detection algorithm to data processing input 362.

On the other hand, where the decoded output fails to converge and no more passes through data detector circuit 365 and data decoder circuit 370 are allowed, a failure indication is provided to retry determination circuit 380 as output 372. Retry determination circuit 380 determines whether another target remains to be used within pre-determined target set 350. Where another target remains to be used, the next target is selected from pre-determined target set 350 and used in relation to processing the same data set from memory buffer circuit 330. This process continues until either the data decode algorithm converges or all of the targets have been tried without success.

Of note, in some embodiments of the present invention the operations of equalizer circuit 335 and equalizer circuit 340 may be performed by a single equalizer circuit. In such a case, the data feeding the single equalizer circuit is selected to be buffered output 332 when a retry is selected using selector input 382, and is selected to be digital samples 327 when a retry is not selected using selector input 382. In such a case, selector circuit 360 is not needed as only one equalized output exists.

Figure 4:
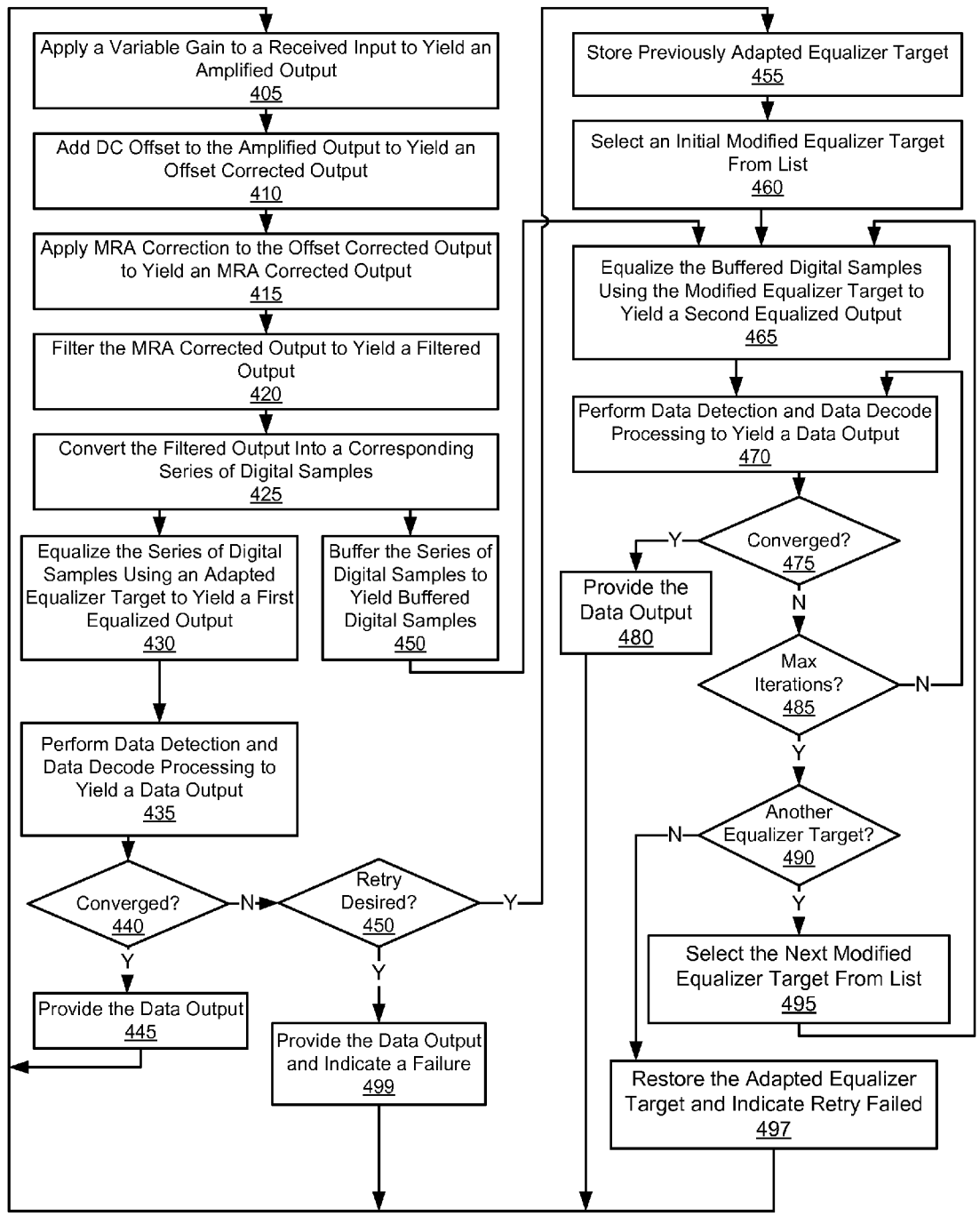
FIG. 4 is a flow diagram showing a method in accordance with various embodiments of the present invention for target adjustment based data retry recovery circuitry.

Turning to FIG. 4, a flow diagram 400 shows a method in accordance with various embodiments of the present invention for target adjustment based data retry recovery circuitry. Following flow diagram 400, a variable gain is applied to a received input to yield an amplified output (block 405). The input may be received from a number of sources including, but not limited to, a storage medium or a data transfer channel. The variable gain amplification may be done using any variable gain amplifier circuit known in the art. A DC offset is added to the amplified output to yield an offset corrected output (block 410). The DC offset is operable to mitigate any offset in the received signal. A magneto-resistive asymmetry correction is applied to the offset corrected output to yield an MRA corrected output (block 415). The magneto-resistive asymmetry correction may be done using any magneto-resistive asymmetry correction approach known in the art. The MRA corrected output is then filtered to reduce noise yielding a filtered output (block 420).

The filtered output is provided to an analog to digital converter circuit that converts the received input into a corresponding series of digital outputs (block 425). The series of digital samples is equalized to yield a first equalized output (block 430). The equalization may be performed, for example, by a digital finite impulse response circuit governed by an adapting target. The series of digital samples are buffered to yield a buffered output (block 450). The buffered output may be used in the situation where extra processing is required to extract an originally written data set from the digital samples.

Data processing is performed including a combination of applying a data detection algorithm and a data decode algorithm to the first equalized output to yield a data output (block 435). It is determined whether the data processing converged (i.e., yielded the original data set or was able to correct all errors)(block 440). Where the data processing converged (block 440), the data output is provided as an output (bock 445) and the next data set is processed.

Alternatively, where the data processing failed to converge (block 440), it is determined whether a retry is desired (block 450). In some cases, a retry is always done. In other cases, the retry is conditioned on some event or scenario such as, for example, sufficient processing bandwidth to perform a retry. Where a retry is not desired (block 450), the failed data output is provided along with a failure indication (block 499). Alternatively, where a retry is desired (block 450), the previously adapted equalizer target (i.e., the target used by block 430) is stored (block 455). An initial modified equalizer target is selected from a set of available targets (block 460), and the buffered digital samples are equalized using the modified equalizer target to yield a second equalized output (block 465). Of note, block 465 may include two processes. First, the newly selected equalizer coefficients may be re-adapted based on the modified equalizer target. Second, the buffered digital samples are equalized using the newly adapted equalizer taps to yield the second equalized output.

The same processing as previously discussed in relation to block 435 is performed on the second equalized output to yield a data output (block 470). It is determined whether the data processing converged (block 475). Where the data processing converged (block 475), the data output is provided as an output (block 480) and the next data set is processed.

Alternatively, where the data processing failed to converge (block 475), it is determined whether a maximum number of iterations have been performed (block 485). The maximum number of iterations is selected to allow adaptation of the modified equalizer target. Where the maximum number of iterations have not been performed (block 485), the processes of blocks 470-485 are repeated. Alternatively, where the maximum number of iterations have occurred (block 485), it is determined whether another equalizer target in the set of available targets remains to be tested (block 490). Where another equalizer target remains (block 490), the next target from the set of available targets is selected (block 495) and the processes of blocks 455-490 are repeated using the newly selected equalizer target. Alternatively, where no more targets remain (block 490), the previously adapted equalizer target stored in block 455 is restored to the equalizer circuit and a retry failure is indicated (block 497), and the next data set is processed.

Figure 5:
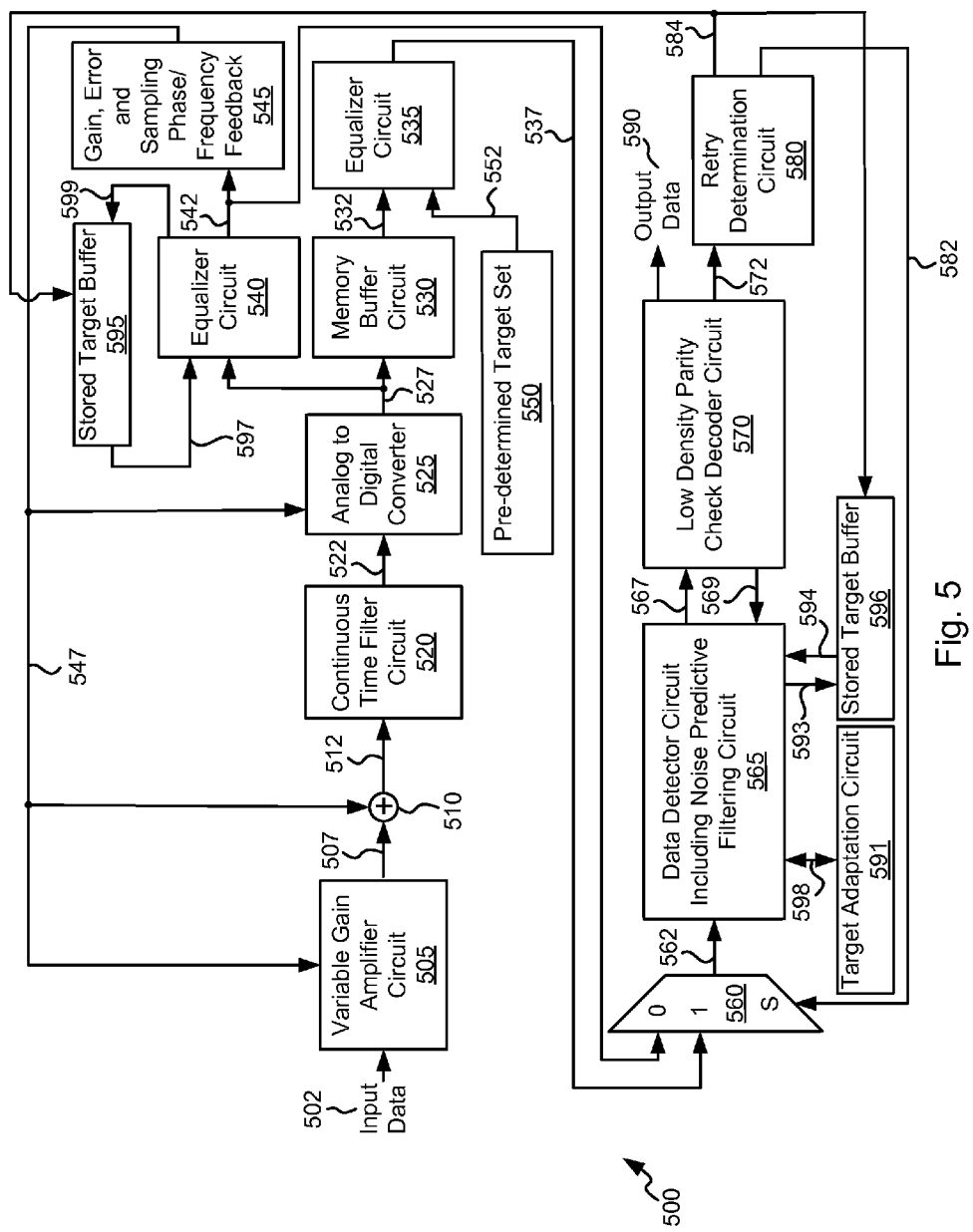
FIG. 5 depicts another data processing circuit including target adjustment retry circuitry in accordance with other embodiments of the present invention.

Turning to FIG. 5, a data processing circuit 500 including target adjustment retry circuitry is shown in accordance with some embodiments of the present invention. Data input circuit 500 includes a variable gain amplifier circuit 505 that applies a variable gain to an input data 502 yielding an amplified output 507. Variable gain amplifier circuit 505 may be any circuit known in the art that is capable of applying a variable gain to a received input. Input data 502 is an analog signal representing information that may be received from a variety of sources including, but not limited to, a storage medium of a storage device or a data transfer medium in relation to a communication device. Based upon the disclosure provided herein, one of ordinary skill in the art will recognize a variety of sources for input data 502. The gain applied by variable gain amplifier circuit 505 is received as part of a parameter set 547. Parameter set 547 includes a number of parameters including, but not limited to, a variable gain feedback provided to variable gain amplifier circuit 505, a DC offset parameter provided to a summation circuit 510, and a phase/frequency feedback provided to an analog to digital converter circuit 525.

Amplified output 507 is added to the DC offset parameter included as part of parameter set 547 to yield an offset corrected output 512. Offset corrected output 512 is provided to a continuous time filter circuit 520 that is operable to filter noise from the received input to yield a filtered output 522. Continuous time filter circuit 520 may be any circuit known in the art that is capable of filtering a received signal. In one particular embodiment of the present invention, continuous time filter circuit 520 is an RC or LC filter as are known in the art. Filtered output 522 is provided to analog to digital converter circuit 525. Analog to digital converter circuit 525 converts filtered output 522 to a corresponding series of digital samples 527. Analog to digital converter circuit 525 may be any circuit known in the art that is capable of converting a continuous time signal into a series of discrete samples. Based upon the disclosure provided herein, one of ordinary skill in the art will recognize a variety of analog to digital converter circuits that may be used in relation to different embodiments of the present invention.

Digital samples 527 are stored to a memory buffer circuit 530 and in parallel provided to an equalizer circuit 540. Memory buffer circuit 530 buffers a defined portion of the received data for later use in a retry process in the event the standard data processing does not converge. Equalizer circuit 540 equalizes the received input to yield an equalized output 542 that is provided to a parameter adaptation circuit 545 that is operable to adjust gain, error and/or sampling phase/frequency feedback signals that are provided as parameter set 547. In one particular embodiment of the present invention, equalizer circuit 540 is a digital finite impulse response filter as are known in the art. In some cases, the filter coefficients or taps used by the digital finite impulse response filter are programmable. In one particular case, the filter coefficients or taps may be adaptable from a default value using adaptation approaches known in the art. Parameter adaptation circuit 545 may be any circuit known in the art that is capable of adapting one or more of a variable gain feedback provided to variable gain amplifier circuit 505, a DC offset parameter provided to a summation circuit 510, a magneto-resistive asymmetry compensation parameter provided to a magneto-resistive asymmetry compensation circuit 515, and/or a phase/frequency feedback provided to an analog to digital converter circuit 525. In addition, equalized output 542 is provided to a selector circuit 560. In one particular embodiment of the present invention, selector circuit 560 is a multiplexer circuit. Based upon the disclosure provided herein, one of ordinary skill in the art will recognize other types of circuits that may be used in place of selector circuit 560.

In normal operation, a selector input 582 is asserted such that selector circuit 560 provides equalized output 542 as a data processing input 562. Data processing input 562 is provided to a data detector circuit 565. Data detector circuit 565 includes a noise predictive filter circuit. Data detector circuit 565 applies a data detection algorithm to data processing input 562 to yield a detected output 567. Data detector circuit may be, but is not limited to, a maximum a posteriori data detector circuit or a Viterbi algorithm data detector circuit as are known in the art. Based upon the disclosure provided herein, one of ordinary skill in the art will recognize a variety of data detector circuits that may be used in relation to different embodiments of the present invention. A target adaptation circuit 591 is operable to adaptively modify a target output 598 that in part governs operation of the noise predictive filter circuit included as part of data detector circuit 565. Target adaptation circuit 591 may implement any process or approach known in the art for adapting coefficients or taps for a noise predictive filtering circuit.

In turn, a data decoder circuit 570 applies a data decode algorithm to detected output 567 to yield a decoded output. In some embodiments of the present invention, the data decode algorithm is a low density parity check algorithm as are known in the art. Based upon the disclosure provided herein, one of ordinary skill in the art will recognize other data decode algorithms that may be used in relation to different embodiments of the present invention. Where the data decode algorithm converges (i.e., the original data is recovered), the decoded output is provided as output data 590 and a successful completion is indicated to a retry determination circuit via an output 572. Alternatively, where the data decode algorithm fails to converge (i.e., errors remain), it is determined whether another pass through data detector circuit 565 and data decoder circuit 570 (i.e., a global iteration) is allowed. Where another pass is allowed, the decoded output is provided as a feedback output 569 to data detector circuit 565 where it is used to guide a subsequent application of the data detection algorithm to data processing input 562.

On the other hand, where the decoded output fails to converge and no more passes through data detector circuit 565 and data decoder circuit 570 are allowed, a failure indication is provided to retry determination circuit 580 as output 572. Retry determination circuit 580 selects whether an offline retry of the currently processing reset is to be performed. In some cases, a retry is performed on all data sets that fail to converge. In other cases, a retry is conditional. Where it is determined that a retry is desired, retry determination circuit 580 asserts a storage control signal 584 that causes the currently adapted target 599 used by equalizer circuit 540 to be stored in a stored target buffer 595, and causes the currently adapted target 593 used by the noise predictive filter circuit of data detector circuit 565 to be stored in a stored target buffer 596. In addition, retry determination circuit 580 asserts selector input 582 causing selector circuit 560 to provide an equalized output 537 as data processing input 562.

In such a retry condition, the data set that failed to converge was previously stored to memory buffer circuit 530 and is available as a buffered output 532. Buffered output 532 is provided to equalizer circuit 535 that equalizes buffered output 532 to yield equalized output 537 that, as discussed above, is provided by selector circuit 560 as data processing input 562. The operation of equalizer circuit 535 is governed at least in part by a target 552 that is selected from a predetermined target set 550. Pre-determined target set 550 may be a number of target values that are stored for use in relation to a retry processing mode of data processing circuit 500.

Data processing input 562 is provided to a data detector circuit 565 that applies the data detection algorithm to data processing input 562 to yield a detected output 567. In turn, data decoder circuit 570 applies the data decode algorithm to detected output to yield a decoded output. Where the data decode algorithm converges (i.e., the original data is recovered), the decoded output is provided as output data 590 and an indication of a successful retry is provided as output 572 to retry determination circuit 580. At this juncture, retry determination circuit 580 asserts selector input 582 such that selector circuit 560 provides equalized output 542 as a data processing input 562, and asserts storage control signal 584 that causes the previously stored target 597 to be loaded back into equalizer circuit 535 and causes the previously stored target 594 to be loaded back into the noise predictive filter circuit of data detector circuit 565 so that the next received data set can rely on the previously adapted targets.

Alternatively, where the data decode algorithm fails to converge (i.e., errors remain), it is determined whether another pass through data detector circuit 565 and data decoder circuit 570 is allowed. Where another pass is allowed, the decoded output is provided as a feedback output 569 to data detector circuit 565 where it is used to guide a subsequent application of the data detection algorithm to data processing input 562.

On the other hand, where the decoded output fails to converge and no more passes through data detector circuit 565 and data decoder circuit 570 are allowed, a failure indication is provided to retry determination circuit 580 as output 572. Retry determination circuit 580 determines whether another target remains to be used within pre-determined target set 550. Where another target remains to be used, the next target is selected from pre-determined target set 550 and used in relation to processing the same data set from memory buffer circuit 530. This process continues until either the data decode algorithm converges or all of the targets have been tried without success.

Of note, in some embodiments of the present invention the operations of equalizer circuit 535 and equalizer circuit 540 may be performed by a single equalizer circuit. In such a case, the data feeding the single equalizer circuit is selected to be buffered output 532 when a retry is selected using selector input 582, and is selected to be digital samples 527 when a retry is not selected using selector input 582. In such a case, selector circuit 560 is not needed as only one equalized output exists.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for limiting the effects of non-linear distortion and/or reducing signal to noise ratio variation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a buffer operable to store received digital samples as a buffered output;
    an equalizer circuit operable to equalize the buffered output using a first equalization target to yield a first equalized output;
    a data processing circuit operable to decode the first equalized output to yield a first data output;
    a retry determination circuit operable to select a second equalization target based at least in part on an occurrence of an error in the first data output, wherein the equalizer circuit is further operable to equalize the buffered output using the equalization target to yield a second equalized output, and wherein the data decoding circuit is further operable to decode the second equalized output to yield a second data output; and
    a target set buffer operable to store at least the first equalization target and the second equalization target, and wherein the first equalization target does not require additional adaptation in the data processing system.

2. The data processing system of claim 1, wherein the data processing circuit includes a data detector circuit and a data decoder circuit.

3. The data processing system of claim 2, wherein the data detector circuit includes a noise predictive filter circuit operable to filter a received input based upon a filter target input, wherein the retry determination circuit is further operable to select the first equalization target based at least in part on an occurrence of an error in a third data output that precedes the first data output, and wherein the retry determination circuit is further operable to cause a previously adapted filter target used as the filter target input to be stored along with selecting the first equalization target.

4. The data processing system of claim 3, wherein the retry determination circuit is further operable to cause the previously adapted equalization target to be restored where the second data output does not exhibit an error.

5. The data processing system of claim 1, wherein the retry determination circuit is further operable to select the first equalization target based at least in part on an occurrence of an error in a third data output that precedes the first data output, and wherein the retry determination circuit is further operable to cause a previously adapted equalization target to be stored along with selecting the first equalization target.

6. The data processing circuit of claim 5, wherein the retry determination circuit is operable to cause the previously adapted equalization target to be restored where the second data output does not exhibit an error.

7. The data processing system of claim 5, wherein the equalizer circuit is a first equalizer circuit, wherein the data processing circuit further comprises a second equalizer circuit, and wherein the second equalizer circuit is operable to:
    equalize the digital samples using the previously adapted equalization target to yield a third equalized output, and wherein the third data output corresponds to the third equalized output.

8. The data processing system of claim 5, wherein the equalizer circuit is further operable to equalize the buffered output using the previously adapted equalization target yield a third equalized output, and wherein the third data output corresponds to the third equalized output.

9. The data processing system of claim 1, wherein the equalizer circuit is a digital finite impulse response filter circuit.

10. The data processing system of claim 1, wherein the data processing system is implemented as part of an electronic device selected from a group consisting of: a data storage device, and a communication device.

11. The data processing system of claim 1, wherein the data processing system is implemented as part of an integrated circuit.

12. A method for data retry processing, the method comprising:
    converting an input signal into a corresponding series of digital samples using an analog to digital converter circuit;
    buffering the digital samples to yield a buffered output;
    equalizing the digital samples using a previously adapted equalization target to yield a first equalized output;
    processing the first equalized output to yield a first data output, wherein the first data output exhibits an error;
    based at least in part on the error:
        storing the previously adapted equalization target;
        selecting a predetermined equalization target;
        equalizing the buffered output using the predetermined equalization target to yield a second equalized output;
        processing the second equalized output to yield a second data output, wherein the second data output is error free, and wherein based at least in part on the error free status, the previously adapted equalization target is restored.

13. The method of claim 12, wherein processing the first equalized target includes applying a data detection algorithm to the first equalized target to yield a first detected output, and applying a data decode algorithm to the first detected output to yield the first data output; and wherein processing the second equalized target includes applying the data detection algorithm to the second equalized target to yield a second detected output, and applying the data decode algorithm to the second detected output to yield the second data output.

14. The method of claim 13, wherein the data detection algorithm includes application of noise predictive filtering governed by a filter target, and wherein the method further comprises:
    storing the filter target based at least at part on the error.

15. The method of claim 14, wherein the second data output is error free, and wherein based at least in part on the error free status, the filter target is restored.

16. The method of claim 12, wherein equalizing the digital samples is done using a first equalizer circuit, and wherein equalizing the buffered output is done using a second equalizer circuit.

17. The method of claim 12, wherein the predetermined equalization target is a first predetermined equalization target, wherein the error is a first error, wherein the second data output exhibits a second error, and wherein based at least in part on the second error:
    storing the previously adapted equalization target;
    selecting a second predetermined equalization target;

equalizing the buffered output using the second predetermined equalization target to yield a third equalized output; and processing the third equalized output to yield a third data output.

18. A storage device, the storage device comprising:

a storage medium;

a magneto-resistive head assembly disposed in relation to the storage medium and operable to provide a sensed signal corresponding to information on the storage medium;

a variable gain amplifier circuit operable to variably amplify a signal derived from the sensed signal to yield an amplified output;

a magneto-resistive asymmetry compensation circuit operable to reduce a non-linearity in the amplified output to yield a corrected output;

an analog to digital converter circuit operable to convert a signal derived from the corrected output into corresponding digital samples;

a buffer operable to store the digital samples as a buffered output;

an equalizer circuit operable to equalize the buffered output using a first equalization target to yield a first equalized output;

a data processing circuit operable to decode the first equalized output to yield a first data output; and a retry determination circuit operable to select a second equalization target based at least in part on an occurrence of an error in the first data output, wherein the equalizer circuit is further operable to equalize the buffered output using the equalization target to yield a second equalized output, and wherein the data decoding circuit is further operable to decode the second equalized output to yield a second data output.

19. The data processing system of claim 1, wherein second equalization target does not require additional adaptation in the data processing system.

20. The method of claim 12, the method further comprising:

storing at least the previously adapted equalization target and the predetermined equalization target, and wherein the previously adapted equalization target and the predetermined equalization target do not require additional adaptation in the data processing system.

* * * * *